US012654162B2

(12) United States Patent
Grein et al.

(10) Patent No.: US 12,654,162 B2

(45) Date of Patent: Jun. 16, 2026

(54) PIPETTING DEVICE

(71) Applicant: BRAND GMBH + CO KG, Wertheim (DE)

(72) Inventors: Tom Grein, Wertheim (DE); Markus Kurz, Wertheim (DE); Dieter Böhm, Wertheim (DE); Kathrin Friedrich, Wertheim (DE); Antonio Romaguera, Faulbach (DE)

(73) Assignee: BRAND GMBH + CO KG, Wertheim (DE)

( * ) Notice: Subject to any disclaimer, the term of this patent is extended or adjusted under 35 U.S.C. 154(b) by 307 days.

(21) Appl. No.: 18/203,375

(22) Filed: May 30, 2023

(65) Prior Publication Data

US 2023/0390758 A1 Dec. 7, 2023

(30) Foreign Application Priority Data

Jun. 1, 2022 (DE) ..................... 10 2022 113 874.7

(51) Int. Cl.
*B01L 3/02* (2006.01)

(52) U.S. Cl.
CPC ......... *B01L 3/0217* (2013.01); *B01L 2200/02* (2013.01); *B01L 2200/087* (2013.01)

(58) Field of Classification Search
CPC ............... B01L 3/0217; B01L 2200/02; B01L 2200/087; B01L 3/0286; B01L 3/021; B01L 2200/14
USPC ............ 73/864.01, 864.11–864.18; 422/501, 422/513–518
See application file for complete search history.

(56) References Cited

U.S. PATENT DOCUMENTS

| | | | |
|---|---|---|---|
| 4,154,108 | A | 5/1979 | Völlinger et al. |
| 2002/0012613 | A1 | 1/2002 | Scordato et al. |
| 2018/0169340 | A1 | 6/2018 | Aneas |

FOREIGN PATENT DOCUMENTS

| | | | | |
|---|---|---|---|---|
| CN | 1882389 | A | 12/2006 | |
| CN | 103946364 | A | 7/2014 | |
| CN | 110145666 | A | 8/2019 | |
| DE | 60104999 | T2 | 8/2005 | |
| EP | 2452753 | B1 | 9/2015 | |
| EP | 3 865 875 | A1 | 8/2021 | |
| JP | 2021520990 | A * | 8/2021 | ............ B01L 3/0224 |
| WO | 02/00346 | A2 | 1/2002 | |

(Continued)

*Primary Examiner* — Robert R Raevis

(74) *Attorney, Agent, or Firm* — Calderon Safran Wright P.C.; David S. Safran

(57) ABSTRACT

A pipetting device (1) for receiving and dispensing fluid volumes, comprising a housing (2) with a holding portion (3), which is constructed for holding the pipetting device (1) by means of an operator's hand, a support device (4), which is designed for supporting the pipetting device (1) on an operator's finger, the support device (4) being rotatable relative to the holding portion (3), preferably about a longitudinal axis (L) of the pipetting device (1). The invention further relates to a pipetting device (1) for receiving and dispensing fluid volumes, comprising a releasable positive connection between a first and a second component of the pipetting device (1). Because the support device is adjustable relative to the holding device into a plurality of different defined rotational positions the pipetting device can be used by either left-handed and right-handed operators or by operators with hands of different sizes.

13 Claims, 9 Drawing Sheets

(56) References Cited

FOREIGN PATENT DOCUMENTS

| | | | |
|---|---|---|---|
| WO | 2005049208 | A1 | 6/2005 |
| WO | 2006/028399 | A1 | 3/2006 |
| WO | 2018/002254 | A1 | 1/2018 |

* cited by examiner

PIPETTING DEVICE

BACKGROUND OF THE INVENTION

Field of the Invention

The invention relates to a pipetting device for receiving and dispensing fluid volumes and/or for handling liquid.

Description of the Related Art

Pipetting devices of the type in question have a housing and a holding portion designed for holding the pipetting device by means of an operator's hand.

Pipetting devices can basically be operated automatically or via a user by means of his operating hand. The present invention focuses in particular on the handling of a pipetting device by means of an operator's hand. In such handling, it is provided that the operator actuates the pipetting device by means of at least one finger. In this case, the pipetting device must be held securely by the operator.

In the prior art, it is known that a support device, which may, for example, be arc-shaped and/or hook-shaped, is provided for supporting the pipetting device. The support device is designed for supporting the pipetting device on a finger of an operator.

In practice, pipetting devices are used regularly and in particular frequently by an operator. The operator's hand can become tired due to the constant repetition of the same movement for pipetting. In everyday laboratory work, a constant repetition of the same movement during pipetting is very common. This results in high demands on pipetting devices in terms of ease of use and manageability of the pipetting device.

In order to improve the manageability of a pipetting device, it is known from International Patent Application Publication WO 2005/049208 A1 to provide a rotation of one component of the pipetting device with respect to another component. International Patent Application Publication WO 2005/049208 A1 relates to an electronic pipette comprising a body, a tip part, a hook part, and a push button part. The push button part is configured to initiate driving of an annular piston by means of an electric motor for absorbing liquid into a tip container of the pipette or for discharging liquid from the tip container of the pipette. Furthermore, the embodiment according to International Patent Application Publication WO 2005/049208 A1 further comprises a display part, wherein the body has a vertical axis. International Patent Application Publication WO 2005/049208 A1 further provides that at least one part selected from the group consisting of the hook part, push button part, and display part is rotatable about a vertical axis of the electronic pipette relative to the body of the pipette. Such rotatability allows to adapt the aforementioned components consisting of the push button part, display part, and hook part to a hand of an operator.

A disadvantage of the known state of the art is that, due to the enabled displacement of the components, operating errors are comparatively often caused in practice. Thus, it cannot be reliably avoided that an undesired adjustment of the push button part, display part and/or hook part takes place. This not only impairs the handling of the pipette, but also leads to a lack of precision during the pipetting process. In particular, in the case of manually operated pipettes a lack of precision can occur due to fatigue (for example, because an operating element is not actuated to the end point). However, since high precision, easy handling and, if possible, exclusion of operating errors during pipetting are necessary in laboratory environments, ergonomic adaptation of the pipette to an operator according to the embodiment disclosed in International Patent Application Publication WO 2005/049208 A1 is in particular in practice refrained from.

One disadvantage of known electric and manually operated pipettes is that, due to the lack of adjustment options for the components, the components can be positioned sterically unfavorable to the operator's hand. This in turn can lead to fatigue or even pain, which results in pauses in the work process and thus time losses.

SUMMARY OF THE INVENTION

It is now an object of the present invention to improve the manageability of a pipetting device as well as to enable adaptability of the pipetting device to different operators.

The above object is solved by a pipetting device for receiving and dispensing fluid volumes according to the present invention which has a housing with a holding portion, the holding portion being designed for holding the pipetting device by means of an operator's hand.

Further, the pipetting device comprises a support device designed for supporting the pipetting device on a finger of an operator, the support device being rotatable relative to the holding portion, preferably about a longitudinal axis of the pipetting device.

In addition, the pipetting device comprises a latching device by means of which the support device is releasably fixable to the housing in a plurality of different and defined rotational positions.

An advantage of the pipetting device according to the invention is that the support device can be adapted to different operators. A rotation of the support device allows that the pipetting device can be used, for example for larger and smaller hands in an ergonomic manner. At the same time, the pipetting device can also be adapted to the hands of right-handed and left-handed operators. The use of different fingers, which are used to support the support device, is also made possible by an adaptability of the support device according to the invention.

Accordingly, an improvement of the ergonomics when operating the pipetting device results in accordance with the invention, which in particular enables the operator to work at least substantially without fatigue. Especially in the case of multiple and regular use of pipetting devices, a design/configuration adapted to the hand of the operator is particularly advantageous and expedient in terms of comfortable use.

Furthermore, a cost reduction can result for the user. This cost reduction is made possible in particular by the fact that the same pipetting device can be used by different people. Therefore, different model types do not have to be kept in stock. Furthermore, there may also be a time saving in high-throughput laboratory work—i.e., multiple use of the pipetting device—because the position of the support device set for the user can be maintained, in particular cannot be unintentionally adjusted. In addition, the user can remember the setting or rotational position that is optimal for them and thus quickly set it again when using the pipetting device again.

The latching device ensures in particular that undesired adjustment of the support device can be prevented. Thus, only by applying a certain force is it possible to rotate the support device relative to the housing or the holding portion. This preferably ensures that operating errors are excluded. In this way, an undesired adjustment of the support device, which is not wanted by the operator, can be reliably avoided. Ultimately, the latching of the latching device must first be released. The latching takes place in particular between the housing and the support device—by appropriate means, as will be explained below.

Consequently, the latching device ensures that a pipetting device according to the proposal meets the high requirements of laboratory use and/or when pipetting in laboratory environments, wherein at the same time also an adaptability to different operators is enabled. The pipetting device can therefore be used by multiple operators in the respective position of the support device that is particularly advantageous for the respective operator.

Thus, according to the invention, the advantageous properties of adaptability can be implemented without having to accept the risk of operating errors.

Accordingly, safe and convenient operation of the pipetting device according to the invention is made possible.

Preferably, the engagement/latching of the latching device can be perceived haptically and/or acoustically by the operator. In particular, by means of the latching device, a division of the rotatable angular range for the support device relative to the housing into multiple angular sections takes place, in which the latching device engages/latches, respectively, and thus enables in particular a fixing of the support device. The angular sections or the rotational angular sections can specify the defined rotational positions and/or, in particular, are directly related to the defined rotational positions. Thus, in a certain angular range, a rotation of the support device with respect to or relative to the housing can preferably be enabled.

The angular range refers in particular to the longitudinal axis of the pipetting device, which preferably represents the central axis of the pipetting device in the longitudinal extension of the pipetting device. The longitudinal extension indicates the direction of the greatest extension of the pipetting device.

In particular, an adjustment and/or a rotation of the support device can be initiated by the operator applying a force to the support device, preferably by means of a finger (which includes a thumb), which in turn leads to the rotation of the support device about the longitudinal axis of the pipetting device. In particular, the force can be applied in the direction of the desired rotation and/or at least substantially in the circumferential direction with respect to the longitudinal axis.

Particularly preferably, the support device is fixed in the longitudinal direction and/or in relation to the longitudinal axis of the pipetting device, but can be moved in the circumferential direction in relation to the longitudinal axis of the pipetting device.

The operation for setting the desired position of the support device can thus preferably be performed almost intuitively by the user, which is particularly user-friendly. A complicated adjustment of certain components of the pipetting device via complex mechanisms can preferably be omitted.

A releasable fixation of the support device to the housing is in particular also understood to mean that the support device, for the change of position, is removed from the housing and/or the pipetting device, is rotated to the desired position or rotational position and is then reconnected to the housing and/or the pipetting device. This use then succeeds in particular via a latching device which need not necessarily be designed in such a way that the rotation of the support device must be carried out on the state attached to the housing. However, the latching device is preferably at least designed in such a way that a rotation of the support device relative to the housing into different rotational positions is made possible, for example by removing the support device from the housing, rotating it into the desired rotational position and then reconnecting it to the housing. Preferred is an embodiment in which the support device is connected to the housing when the position is changed.

In the aforementioned embodiment of the removable arrangement of the support device from the housing and/or in further embodiments, it may be provided that the support device is arranged to be mounted and/or held on the housing. Such an arrangement in particular simplifies the provision and connection of a support device.

In particular, the pipetting device according to the invention has a volume setting device. The volume setting device is preferably designed for setting a pipetting volume, in particular a pipetting volume desired by the operator. The set volume can in particular be displayed on a volume display, which may be arranged on the housing, and/or read off by the operator.

Furthermore, the pipetting device can have an ejector device for ejecting a pipette tip attached to the pipetting device. The ejector device can be actuated in particular by a release element, in particular an ejector button.

In particular, the gripping around the pipetting device by the hand of an operator is predetermined by the shape of the holding portion, by the position of the release element and/or by the position of the volume display. Furthermore, a cross-section, in particular an at least substantially elliptical and/or at least substantially oval cross-section, of the pipetting device and/or of the holding portion can specify/prescribe in which position the user grips the pipetting device at the holding portion. According to the invention, by positioning and/or fixing the support device in a rotational position, it is now possible to find the optimum position for the operator and also to assume it during use of the pipetting device. At the same time, the operator can preferably comfortably read off the set volume on the volume display and/or easily operate the release element. Accordingly, fixing the support device in different positions and/or rotational positions can ensure that during use of the pipetting device, in addition to the ergonomics, the manageability can also be significantly improved, preferably in that an adjustment/setting and/or positioning of the support device can also be made in dependence on the arrangement of the volume display and/or the position of the release element. Accordingly, the operator or user can read off the set volume from the volume display and/or easily reach the release element while also operating the pipetting device.

In a particularly preferred embodiment, the support device is releasably fixable to the housing in at least three, preferably nine, defined rotational positions, which result in particular from the subdivision into the angular sections, adjacent rotational positions being spaced apart from one another at a rotation angle of at least 5°. In this context, it is understood in particular that a fixation of the support device can be achieved via the latching device, so that by the interaction between the latching device and the housing, the different rotational positions of the support device are ensured and preferably respectively fixed. Preferably, between 3 to 20, more preferably between 4 to 15, different rotational positions are provided, wherein the rotation angle between two adjacent rotational positions can be in particular between 5° to 20°, preferably between 7° and 15° and in particular 12°±2°. The rotation angle between two adjacent rotational positions depends in particular on the absolute range of rotation in relation to the zero position of the support device and/or on the number of rotational positions.

Due to the different rotational positions, in particular different positions for setting/adjusting the support device are also made possible, so that for different operators' hands—for example, for left-handed and right-handed operators or for operators' hands of different sizes—different specifications/settings are available in which the support device can be set/adjusted. Thus, a high and individual adaptability of the pipetting device for the operators is made possible. In particular, the aforementioned rotation angles ensure that the distance between two adjacent rotational positions is not too small, so that it would no longer be perceived by the operator; however, a sufficient number of different end positions of the support device can be provided within a certain angle range. Preferably, the support device can only be positioned in the defined rotational positions, so that a position or positioning of the support device outside the rotational positions is in particular not possible.

In particular, starting from a so-called zero position, an adjustment or rotation of the support device by up to ±80°, preferably up to ±70°, more preferably ±50°±10%, can be enabled. The zero position of the support device indicates in particular the orientation of the support device in the rest position and/or original position, which reflects the regular standard usage situation. Starting from this position of use, an adjustment/adaption can be made in different directions of rotation. The zero position can be selected differently for different pipetting devices, but is preferably specified for each individual pipetting device.

In a further preferred embodiment, the releasable fixing of the support device in the rotational positions on the housing can be controlled by a locking element, preferably a locking button. In particular, a release of the support device can be enabled and/or released via the locking element, wherein alternatively or additionally a latching of the support device can also be controlled and/or specified via the locking element. Accordingly, the locking element offers a further preferred possibility to prevent an undesired adjustment of the support device at least substantially reliably. However, in further embodiments, the invention can also be implemented without a locking element.

Preferably, the latching device has an engagement element and a plurality of counter-engagement elements. The engagement element can be brought into form-fitting/positive, force-fitting/non-positive and/or frictional engagement with each counter-engagement element. Through this engagement, the support device can be releasably fixed to the housing in one of the rotational positions in each case. Thus, latching is achieved by the interaction between an engagement element and a counter-engagement element. The multiple rotational positions can be enabled in particular by the arrangement and/or design of the counter-engagement elements. Thus, a spacing of the different rotational positions can also be achieved by a certain spacing of the counter-engagement elements. The engagement element can be designed at least in areas and/or partially corresponding and/or complementary to the counter engagement elements.

The interaction between the engagement element and the respective counter-engagement element in particular enables a fixing of the support device in the individual rotational positions, although this fixing can be released again in particular by actuating the support device, preferably by exerting a force on the support device.

When the latching of the latching device is released, the engagement element is then disengaged from the respective counter-engagement element and again guided and/or brought into engagement with a further counter-engagement element. The setting/adjustment in this respect—i.e. bringing engagement element and counter-engagement element into and out of engagement—is preferably repeated until the desired position of the support device is reached.

In a further preferred embodiment, the counter-engagement elements are formed on the housing. In particular, the counter-engagement elements can be formed by recesses and/or elevations on the housing. These recesses and/or elevations can be formed at a distance from one another and preferably be arranged on a wall of the housing facing the engagement element. The wall of the housing facing the engagement element can in particular be arranged on the inside of the housing, not accessible to the operator.

Furthermore, in a preferred, further embodiment, it is provided that the latching device has a connecting element which is rotatably connected to the housing and non-rotatably or rotationally fixed connected to the support device and on which the engagement element is preferably movably, in particular rotatably, arranged. In particular, the engagement element is movably mounted on the connecting element, so that the engagement element is fixed by the connecting element in the state of use of the pipetting device. The connecting element allows in particular a transmission of the rotation, which is specified by the support device for adjusting the support device, to the latching device.

In a further preferred embodiment of the present inventive idea, a spring element, in particular a leaf spring, is arranged at the connecting element, the engagement element being arranged between the spring element and the counter-engagement elements. In the case of a leaf spring as the spring element, this is preferably made of metal. In particular, the engagement element is arranged between the spring element and the counter-engagement elements in such a way that the spring force of the spring element counteracts a rotation of the support device when the engagement element is engaged with a counter-engagement element and/or that the spring force of the spring element acts on the engagement element in the direction of one of the counter-engagement elements. The spring element ensures, in particular, that a rotation of the connecting element and, consequently, of the support device can still be ensured, although the spring force of the spring element must be overcome for this purpose, among other things, so that the engagement element can be brought out of engagement with the respective counter-engagement element. Likewise, the spring force ensures in particular that an undesired rotation of the support device is not triggered, which is particularly advantageous for avoiding operating errors. Thus, the spring element can ensure that a rotation of the support device is achieved only preferably by corresponding specification/input by the operator.

Preferably, the latching device is designed such that a torque of at least 3 Ncm, preferably of at least 5 Ncm, more preferably of at least 10 Ncm, preferably between 10 to 30 Ncm, is required to rotate the support device when the engagement element is engaged with a counter-engagement element. The aforementioned torque is also ensured by the spring force of the spring element to be overcome in a preferred embodiment. The torque in the aforementioned order of magnitude ensures in particular that the rotation of the support device is deliberately initiated by the operator and thus an unintentional rotation can be prevented, since in the event of an unintentional movement, in particular torques in the aforementioned order of magnitude are not exerted.

In a particularly preferred embodiment, the engagement element can be designed/constructed as a ball. The design/construction as a ball enables optimized engagement with counter-engagement elements, which are formed in particular on the housing. Alternatively or additionally, it can be provided that the engagement element is mounted rotatably, in particular rotatably about itself and/or relative to the housing, on an outer side of the connecting element.

In particular, the engagement element can be arranged at a corresponding receptacle of the connecting element, which is preferably formed by projections of the connecting element. The connecting element can also have a recess in the region of the receptacle, so that in particular contacting of the spring element to the engagement element can be ensured. The recess of the connecting element can also extend beyond the receptacle and serve in particular to arrange the spring element.

Preferably, the connecting element is designed and arranged in such a way that the connecting element is mounted movably in the circumferential direction, in particular relative to the housing. A corresponding movement made possible in this respect ensures in particular that the support device is fixable in different rotational positions.

In particular, the engagement element can be acted upon by the spring force of the spring element, preferably by ensuring that the engagement element abuts against the spring element at least during the rotation of the support device.

Particularly preferably, the engagement element is formed in one piece, which can reduce the production effort of the pipetting device according to the invention.

In a further embodiment, the engagement element is preferably integrally formed with the connecting element. Also in this embodiment, a convenient, safe and improved setting/adjustment of the support device can be made possible.

In a further preferred embodiment, in which in particular the connecting element and/or at least part of the support device is integrally formed with the engagement element, the engagement element has an arm which is connected at one end to the connecting element and at another end has a latching lug which is engageable with the counter-engagement elements. In this embodiment, it is also preferably provided that the counter-engagement elements are formed on the housing, preferably by corresponding projections and/or elevations and/or recesses. Preferably, the arm is spring-elastic, wherein a spring force is generated which counteracts rotation of the support device when the latching lug is engaged with a counter-engagement element. In such a preferred embodiment, in particular, a spring element of the aforementioned type can be omitted, since the spring properties can preferably be ensured/provided by the arm itself. Thus, also in this embodiment, an operating error of the pipetting device can be at least substantially reliably avoided, so that a rotation of the support device relative to the housing is initiated only by specification of the respective operator.

Particularly preferably, the support device is multi-part and may include a first support part and a second support part. The first support part may be engaged with the housing, the connecting element, and the second support part, wherein the second support part may form an anti-rotation device between the first support part and the connecting element.

The first and second support parts can be connected in a force-fit, friction-fit, form-fit and/or material-fit, preferably adhesively bonded, manner to form the support device.

The anti-rotation device can enable that a counter-support for the support device is provided and an undesired rotation between the connecting element and the support device can be prevented, so that the connecting element can be connected to the support device in a rotationally fixed manner. In particular, the anti-rotation device can be formed by a toothing on the second support part and a counter-toothing on the connecting element, the counter-toothing being complementary to the toothing. In particular, therefore, the anti-rotation device is formed by a form fit between the toothing and the counter-toothing.

Preferably, the counter-toothing has a plurality of counter-teeth, wherein the toothing may also have a plurality of teeth. The teeth of the toothing can be arranged preferably in a form-fitting manner in the gaps formed between the counter-teeth. Particularly preferably, the number of teeth and/or gaps formed between adjacent teeth exceeds the number of counter-teeth of the counter-toothing. Accordingly, the counter-toothing can be connected to the toothing in multiple positions and/or the toothing provides multiple arrangement options for the counter-toothing. Accordingly, the anti-rotation device can also be adapted and/or optimized depending on the arrangement of the connecting element on the support device.

In a further preferred embodiment of the pipetting device, it is provided that the support device has a stop and the housing has a counter stop, which limit the path that the support device is rotatable relative to the housing. Through the interaction between the stop and the counter stop, the maximum rotatability and/or the maximum rotation angle can thus be specified starting from the zero position of the support device.

Furthermore, the pipetting device can have a device for haptic and/or acoustic indication of one of the rotational positions. Thus, the operator is indicated in a simple manner whether a latching of the support device is present and whether the support device is arranged and fixed in the desired position.

In particular, the device for haptic and/or acoustic indication can be provided by the latching device and/or the latching device has the device for haptic and/or acoustic indication. The latching in the individual rotational positions can be indicated to the user in particular via sounds occurring during the latching.

Furthermore, the present invention relates to a pipetting device for receiving and dispensing fluid volumes, having a housing with a holding portion which is designed for holding the pipetting device by means of an operator's hand, and a support device which is designed for supporting the pipetting device on an operator's finger, the support device being rotatable relative to the holding portion, preferably about a longitudinal axis of the pipetting device. Furthermore, the pipetting device has a locking device by means of which the support device is releasably lockable in a plurality of different rotational positions on the housing.

In particular, the aforementioned pipetting device according to the invention represents an alternative to the pipetting device described above and, in particular, can be implemented independently. In particular, the aforementioned design/configuration relates to an independent embodiment that also solves the previously described task/object.

In this context, it is understood that with regard to preferred embodiments and/or advantages of the pipetting device according to the invention, reference may be made to the aforementioned explanations for the pipetting device of the first alternative, which may also apply in the same way to the pipetting device according to the invention of the further alternative, without this requiring an explicit explanation.

In the aforementioned alternative embodiment of the pipetting device, no latching device is required. In particular, the pipetting device can be locked and/or fixed in freely selected rotational positions, preferably 360° circumferentially around the housing and/or in the circumferential direction, by means of the locking device. This locking can also be released via the locking device, in particular for changing the position of the support device relative to the housing. Accordingly, by omitting the latching device, it can also be made possible in particular that no defined and/or predetermined rotational positions have to be used.

In particular, an orientation marking can be provided on the housing, preferably a scale, to visibly indicate preferred rotation positions to the user of the pipetting device. With this orientation marking, the user can also set positions or rotational positions of the support device that are particularly preferred by him.

In addition, the orientation marking can also be applied and/or changed by the user in particular. In this way, the user can mark the rotational positions that are particularly efficient and/or ergonomically advantageous for him and quickly set them when using the pipetting device again.

The locking device can have a locking element, in particular a locking button, by means of which the user can preferably operate the locking device. Preferably, the locking element can be operated by the user's hand encompassing the pipetting device.

Furthermore, the present invention relates also to a pipetting device for receiving and dispensing fluid volumes, comprising a releasable form-fit connection or releasable positive connection between a first and a second component of the pipetting device, wherein the form-fit connection is designed in such a way that the first and the second component are in direct contact with each other, at least in certain areas, preferably inserted or plugged into one another, and are connectable to one another and disconnectable/releasable from one another by respectively rotating in opposite directions, the first component having a first inclined plane and the second component having a further inclined plane, formed complementary to the first inclined plane, for implementing the form-fitting connection.

The implementation of the form-fit connection according to the invention has, among others, the advantage that a tolerance compensation can take place. Any differences in the size of the structural parts, e.g. caused by production fluctuations, can lead to an undesirable gap between them. Such an undesirable distance can be avoided or reduced by means of the implementation of the form-fit connection according to the invention.

In particular, the aforementioned pipetting device according to the invention represents an alternative to the pipetting devices described above and, in particular, can be implemented independently. In particular, the aforementioned design/configuration relates to an independent embodiment that also solves the previously described task/object.

In this context, it is understood that with regard to preferred embodiments and/or advantages of the pipetting device according to the invention, reference may be made to the aforementioned explanations regarding the two further alternative pipetting devices, which may also apply in the same way to the pipetting device according to the invention of the further alternative, without this requiring an explicit explanation. Likewise, the explanations regarding this preferred embodiment of the pipetting device may also apply to the further alternative embodiments of the pipetting device.

The form-fit connection can in particular be a mechanical connection of the two components, preferably in relation to the respective longitudinal axes, which is preferably quickly producible and releasable. Preferably, the form-fit connection is provided by a bayonet lock between the two components of the pipetting device.

The first inclined plane and/or the further inclined plane can in particular have an at least substantially smooth and/or flat run-up slope.

The form-fit connection enables the connection and also the possibly necessary release of two components of the pipetting device according to the invention in a simple manner. In addition, the form-fit connection can block the movement of at least the first and/or second component in at least one degree of freedom of movement. Accordingly, the handling of the pipetting device is substantially simplified.

The aforementioned aspects and features of the present invention, as well as the aspects and features of the present invention resulting from the further description, may be realized independently of each other, but also in any combination.

Further advantages, features, characteristics and aspects of the present invention will be apparent from the following description of preferred embodiments with reference to the drawings.

DETAILED DESCRIPTION OF THE INVENTION

In the figures, the same reference signs are used for the same or similar parts, achieving corresponding characteristics and advantages, even if a repeated description is omitted for simplicity.

Figure 1:
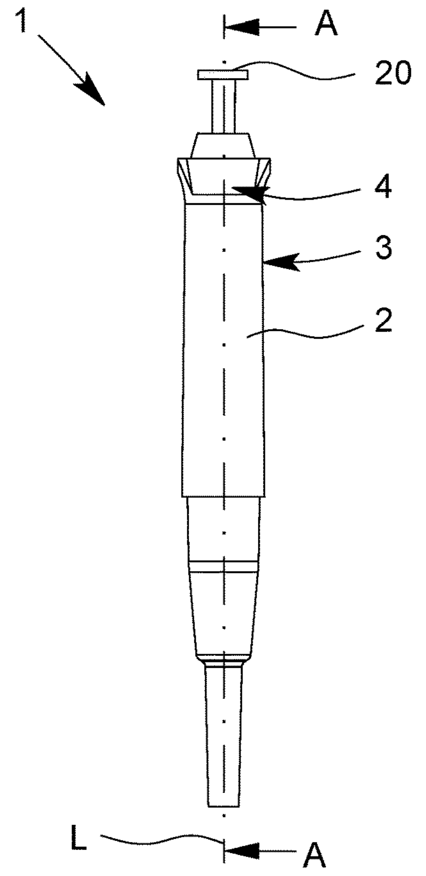
FIG. 1 shows a schematic perspective view of a pipetting device according to the invention.

FIG. 1 shows a pipetting device 1 for receiving and dispensing fluid volumes. The pipetting device 1 is held and guided by hand at its housing 2.

Figure 2:
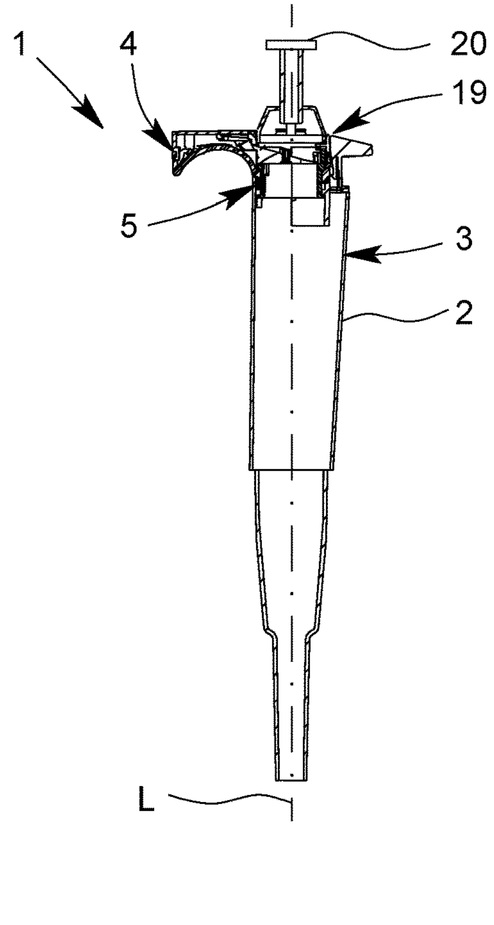
FIG. 2 shows a schematic section A-A of the pipetting device shown in FIG. 1.

FIG. 2 shows a schematic section A-A through the pipetting device 1 shown in FIG. 1. Not shown is a pipette tip which can be attached to the lower end of the housing 2 of the pipetting device 1.

It is not shown in more detail that the pipetting device 1 has a displacement device. By means of the displacement device, a fluid, in particular a liquid, can be received into the pipette tip and subsequently dispensed therefrom. The displacement device can comprise a displacement element and a displacement housing. For reasons of simplification, not all components of the pipetting device are shown in detail in the section in FIG. 2.

A piston-cylinder arrangement can be provided as the displacement device, so that the displacement element can be designed as a piston and the displacement housing as a cylinder.

The pipetting device 1 shown in FIG. 1 preferably has an elongated shape and has a longitudinal axis L. The longitudinal axis L preferably runs centrally through the pipetting device 1 and/or through the displacement device, in particular through the displacement element and the displacement housing.

When terms such as "axial", "axial direction" and the like are used in the following, these refer to the longitudinal axis L. Correspondingly, terms such as "radial", "radial direction" and the like also refer to the longitudinal axis L and indicate a direction perpendicular to the longitudinal axis L. When terms such as "top", "bottom" and the like are used in the following, this refers to the extension of the longitudinal axis L.

As shown in FIG. 2, the pipetting device 1 has a drive device 19 for moving the displacement element in the displacement housing. It is not shown in more detail that the drive device 19 comprises a drive rod. The drive rod may extend axially and/or along the longitudinal axis L. Preferably, the drive rod is movable in axial direction and/or at least parallel to the displacement element. Furthermore, the drive device 19 preferably comprises an operating element 20. In particular, the drive device 19 can be actuated via the operating element 20.

Actuating the operating element 20, in particular pressing down, causes the drive rod to be pressed against the displacement element, so that the displacement element moves into the displacement housing and reduces the volume of the cavity. Accordingly, by actuating the drive device 19 and/or the operating element 20, previously received fluid can be dispensed from the pipetting device 1.

Unactuated, the displacement element, the drive device 19, the drive rod and/or the operating element 20 can return to the initial position automatically, in particular by means of resetting by a resetting element, which is not shown in more detail.

The pipetting device 1 according to the invention has a holding portion 3 on the housing 2, which is designed for holding the pipetting device 1 by means of an operator's hand. Furthermore, the pipetting device 1 comprises a support device 4, which is shown in more detail in FIG. 9.

Figure 13:
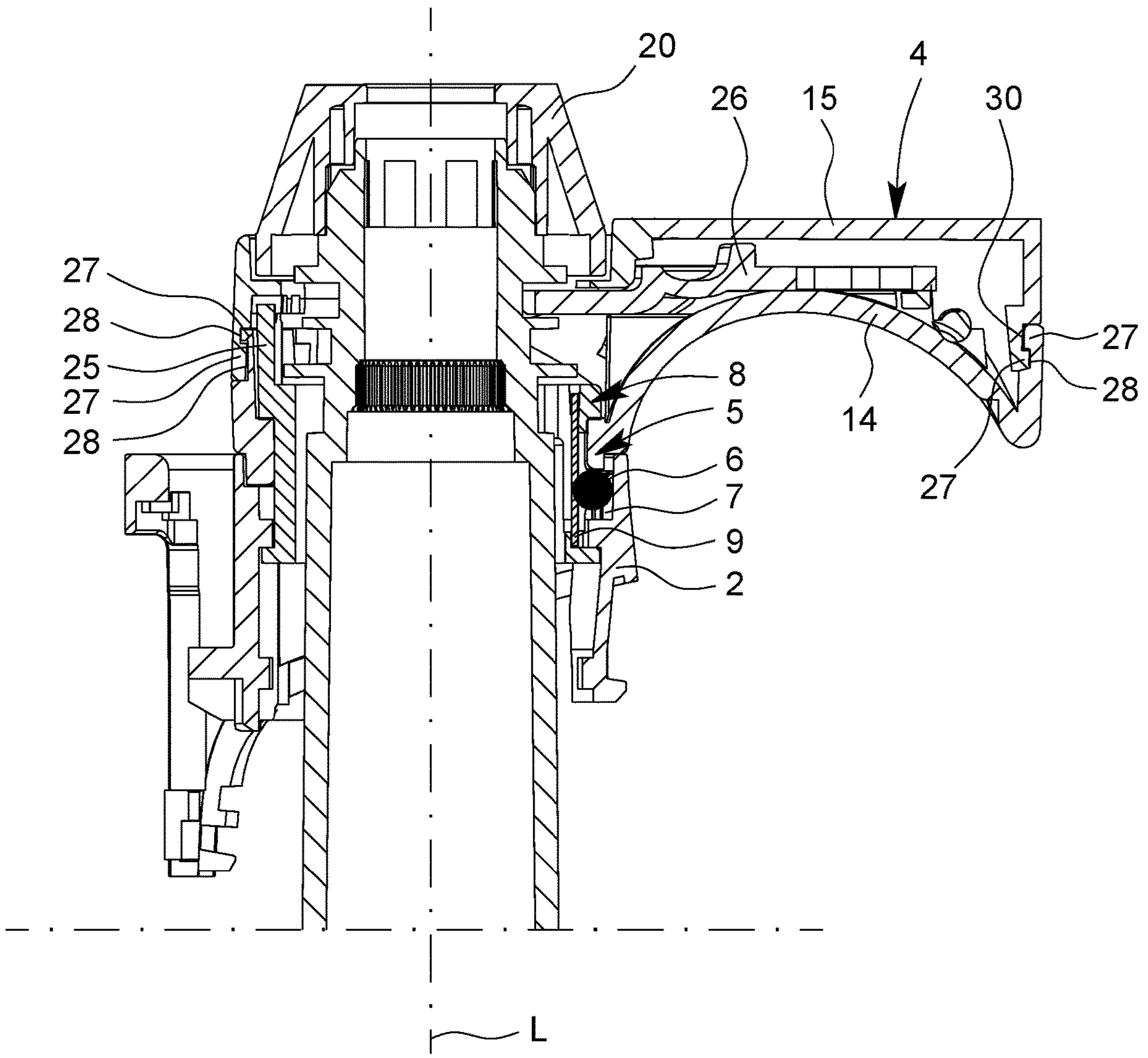
FIG. 13 shows a schematic section of parts of a further embodiment of a pipetting device according to the invention.

FIG. 13 shows a section through the support device 4 as well as the upper portion of the pipetting device 1.

The support device 4 is designed to support the pipetting device 1 on a finger of an operator. According to the invention, it is provided that the support device 4 is rotatable relative to the holding portion 3. In the illustrated and preferred embodiment, it is provided that a rotation about the longitudinal axis L of the pipetting device 1 takes place.

Figure 7A:
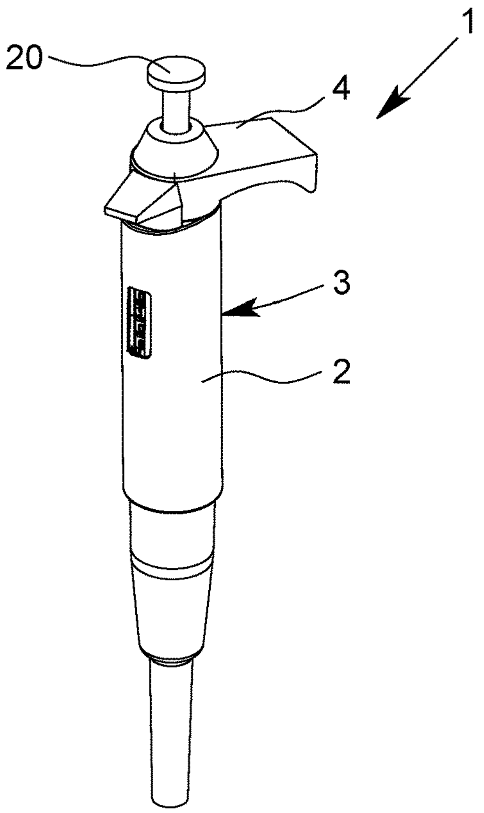
FIG. 7A shows a schematic perspective view of a further embodiment of a pipetting device according to the invention in a first state.
Figure 7B:
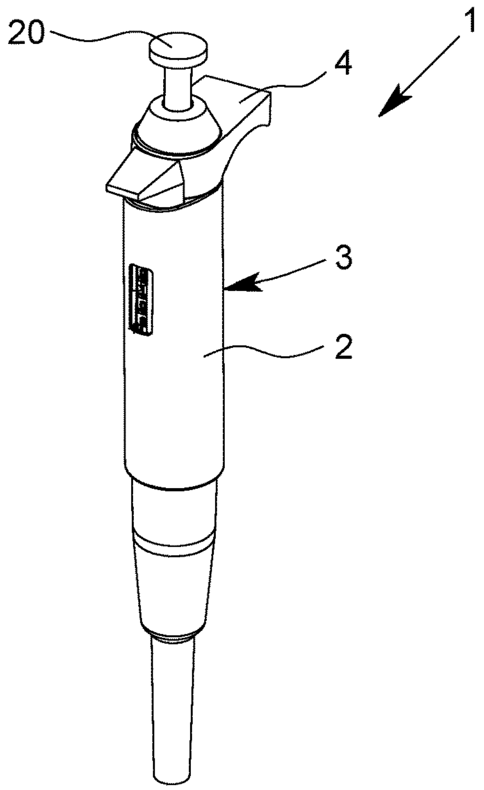
FIG. 7B shows a schematic perspective view of the pipetting device shown in FIG. 7A in a second state.
Figure 7C:
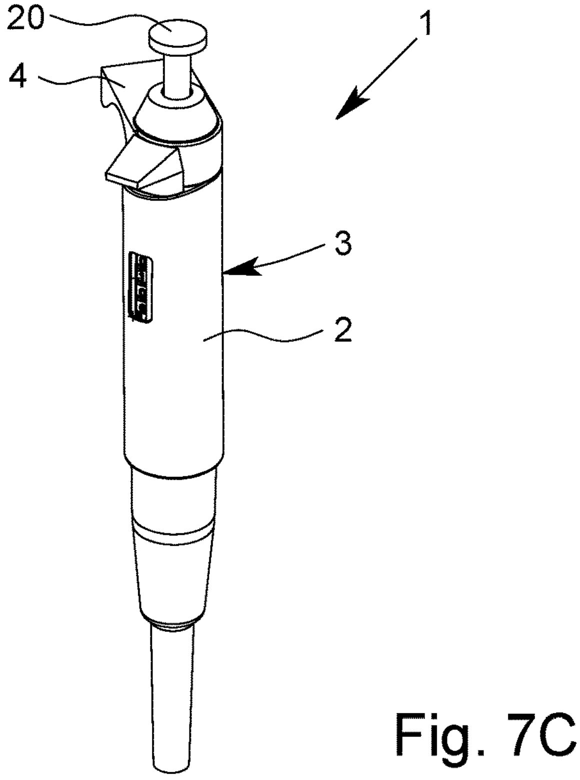
FIG. 7C shows a schematic perspective view of the pipetting device shown in FIG. 7A in a third state.

In FIGS. 7A to 7C, different positions of the support device 4 that can be assumed by rotating the support device 4 about the longitudinal axis L are shown in a perspective schematic view.

Figure 8A:
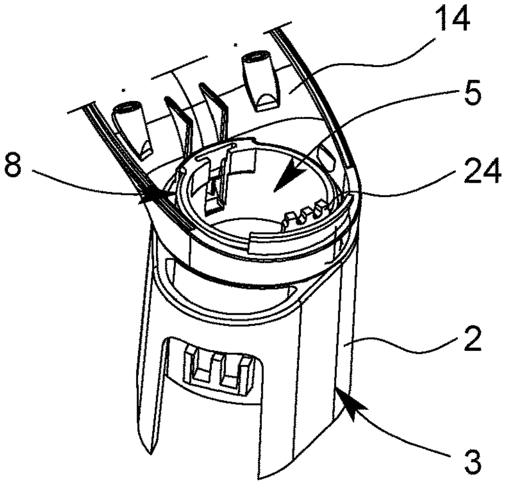
FIG. 8A shows a schematic perspective view of a first support part, which is attached to the housing, of a support device according to the invention in a first state.
Figure 8B:
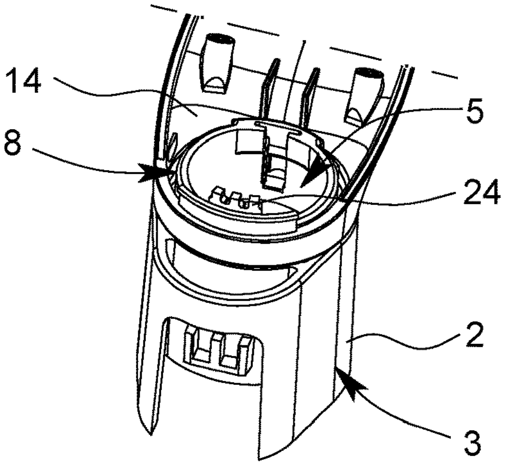
FIG. 8B shows a schematic perspective view of the support device shown in FIG. 8A in a second state.
Figure 8C:
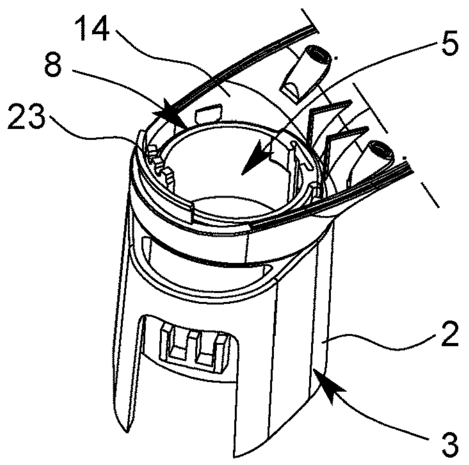
FIG. 8C shows a schematic perspective view of the support device shown in FIG. 8A in a third state.

Also FIGS. 8A to 8C show a part of the support device 4, namely a first support part 14 of the support device 4, in different positions that can be assumed by rotating the support device 4 and/or the first support part 14 about the longitudinal axis L relative to the housing 2.

FIG. 13 further shows that the pipetting device 1 has a latching device 5. The latching device 5 is designed in such a way that the support device 4 is detachably/releasably fixable to the housing 2 in a plurality of different defined rotational positions. These different rotational positions can be seen, for example, in the previously explained FIGS. 7A to 7C.

The latching device 5 may be designed in such a way that a rotation of the support device 4 can be achieved by a force exerted on the support device 4, in which the latching device 5 must first be released. Subsequently, latching of the latching device 5 takes place to fix the desired rotational position. For example, the force to rotate the support device 4 can be exerted, in particular in the radial direction, by the hand of a user and in particular by the finger on which the support device 4 is supported.

In particular, the support device 4 can be releasably fixable to the housing 2 in at least three defined rotational positions. For example, three different rotational positions are shown in FIGS. 7A to 7C. It is understood that further rotational positions may also be adopted according to the invention, for instance between 3 to 20, preferably between 3 to 15, rotational positions may be adopted by the support device 4. Adjacent rotational positions can be spaced apart by a rotation angle of at least 5°, preferably at least 10°±5°.

Equal spacing may be provided between different rotational positions. In further embodiments, the different rotational positions can also be spaced apart by different rotation angles. However, the rotation angle is in particular at least 5° between two directly adjacent rotational positions.

Figure 3:
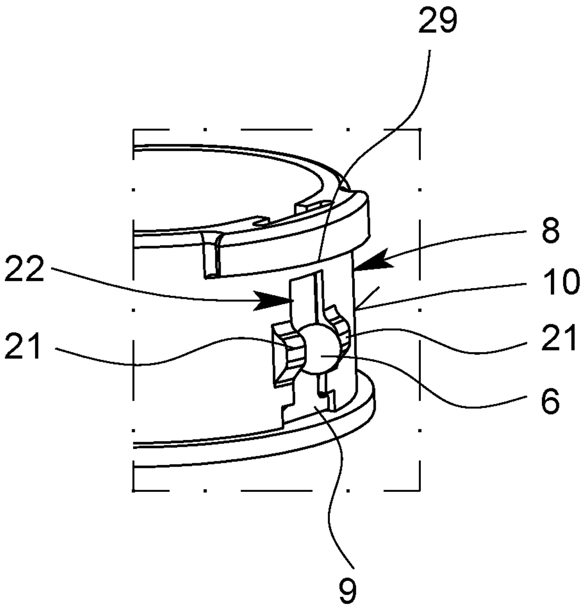
FIG. 3 shows a schematic perspective view of a detail of a connecting element according to the invention.

FIG. 13 shows that the latching device 5 preferably has an engagement element 6. A plurality of counter-engagement elements 7 correspond to the engagement element 6, which are shown in more detail in FIG. 4, for example. FIG. 3 shows a detailed view on the engagement element 6. In the inserted state of the engagement element 6, it is provided that the engagement element 6 can be brought into form-fit/positive, force-fit/non-positive and/or frictional engagement with each counter-engagement element 7, as this is shown schematically in FIG. 13. By the engagement of the engagement element 6 with each counter-engagement element 7, the support device 4 can be releasably fixable to the housing 2 in one of the rotational positions, respectively. In this way, the counter-engagement elements 7 can specify the rotational positions of the support device 4 in which it is fixable. Via the spacing of the counter-engagement elements 7, also the rotation angle between adjacent rotational positions can be set.

Figure 4:
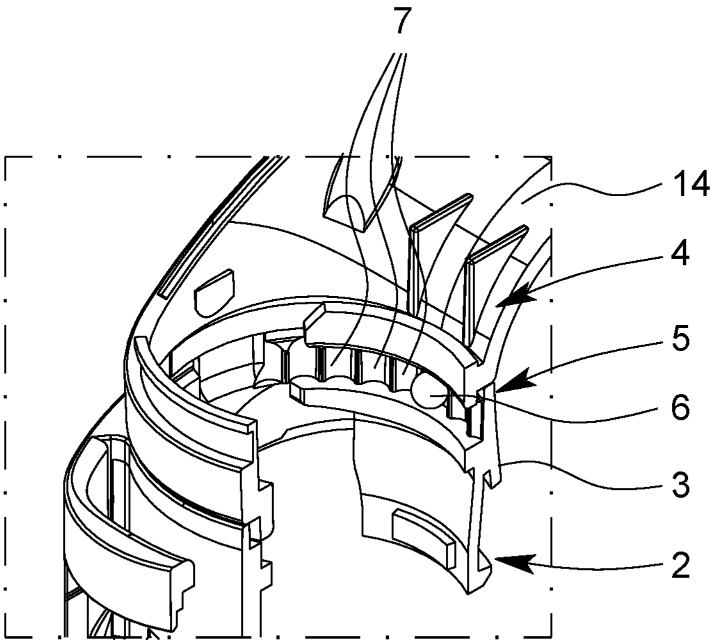
FIG. 4 shows a schematic perspective view of the interaction between an engagement element according to the invention and a counter-engagement element.

In particular, the counter-engagement elements 7 are equally spaced from one another, as shown schematically in FIG. 4. However, it is also possible for a different distance to be provided between adjacent counter-engagement elements 7.

FIG. 4 shows that the counter-engagement elements 7 are preferably formed on the housing 2, in particular by recesses and/or elevations on the housing 2. Accordingly, the engagement element 6 can be brought into engagement with the corresponding recesses and/or elevations of the housing 2, which enables latching/locking of the latching device 5.

It is not shown that in a further preferred embodiment the releasable fixing of the support device 4 in the rotational positions on the housing 2 can be controlled by a locking element, preferably a locking button. In particular, a release of the support device 4 can be effected via the locking element, wherein alternatively or additionally the latching of the support device 4 in the individual or respective rotational positions can also be controlled and/or predetermined via the locking element.

According to the preferred embodiment example shown in FIG. 13, the latching device 5 may comprise a connecting element 8. The connecting element 8 may be rotatably connected to the housing 2 and non-rotatably connected to the support device 4. In FIG. 3, a detail of the connecting element 8 is shown schematically. Furthermore, FIG. 3 shows that the engagement element 6 is arranged movably, in particular rotatably, preferably rotatably about the ball center, on the connecting element 8. In the exemplary embodiment shown in FIG. 3, the engagement element 6 is arranged between two projections 21 of the connecting element 8, which are arranged on the outer side 10 of the connecting element 8 facing the housing 2. The projections 21 may form a receptacle for arranging the engagement element 6.

A rotationally fixed arrangement of the connecting element 8 on the support device 4 is shown schematically in FIG. 13.

Figure 14:
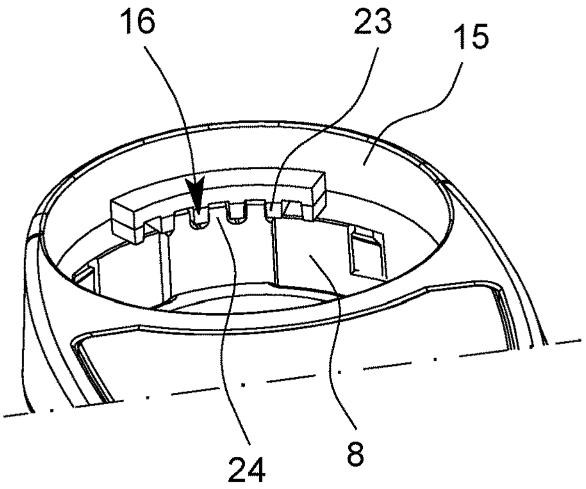
FIG. 14 shows a schematic perspective view of an anti-rotation device according to the invention.

FIG. 14 shows a schematic perspective view of a part of the connecting element 8 connected to the support device 4. In addition, FIG. 14 shows that the connecting element 8 is connected to the support device 4 in a rotationally fixed manner, in particular at least also via an anti-rotation device 16.

Preferably, the connecting element 8 can be tensioned with the support device 4, in particular by means of a bayonet lock, preferably rotatably tensioned relative to the housing.

Preferably, a spring element 9 is arranged on the connecting element 8. The spring element 9 is shown in more detail in FIG. 3, among others.

The spring element 9 can be a component of the latching device 5. In the preferred exemplary embodiment shown in FIGS. 4 to 5, the spring element 9 is designed as a leaf spring. Furthermore, FIG. 13 shows that the engagement element 6 is arranged between the spring element 9 and the counter-engagement elements 7. In particular, the spring element 9 can be associated with a recess 22 of the connecting element 8 in such a way that the spring element 9 spans at least partially, preferably completely, the recess 22 of the connecting element 8. Furthermore, the receptacle formed by the projections 21 of the connecting element 8 for the engagement element 6 may also face the recess 22 and/or be at least substantially directly adjacent to the recess 22. The shape of the recess 22 can in particular be adapted to the shape of the spring element 9.

Preferably, the engagement element 6 is arranged between the spring element 9 and the counter-engagement elements 7 in such a way that the spring force of the spring element 9 counteracts a rotation of the support device 4 when the engagement element 6 is engaged with a counter-engagement element 7 and/or that the spring force of the spring element 9 acts on the engagement element 6 in the direction of one of the counter-engagement elements 7.

In the preferred embodiment shown in FIG. 13, it is provided that the latching device 5 is designed in such a way that a torque of at least 5 Ncm, preferably between 5 to 30 Ncm, is required to rotate the support device 4 when the engagement element 6 is engaged with the respective counter-engagement element 7. A torque in the aforementioned order of magnitude can ensure that an unintentional rotation of the support device 4 can be prevented. A rotation of the support device 4 should in particular only occur if this is deliberately specified by the operator. Ensuring such a conscious specification can be guaranteed in particular by the previously mentioned torque. This torque can also be ensured due to the spring-elastic design of the spring element 9. Thus, the spring force of the spring element 9 can specify the torque to be applied.

FIG. 3 shows that the engagement element 6 is preferably designed as a ball. Furthermore, the engagement element 6 can be mounted in particular on the outer side 10 of the connecting element 8, which side can face the housing 2 in the installed state.

The connecting element 8 may be designed and arranged such that the connecting element 8 is mounted so as to be movable in the circumferential direction, in particular movable relative to the housing 4.

Figure 11:
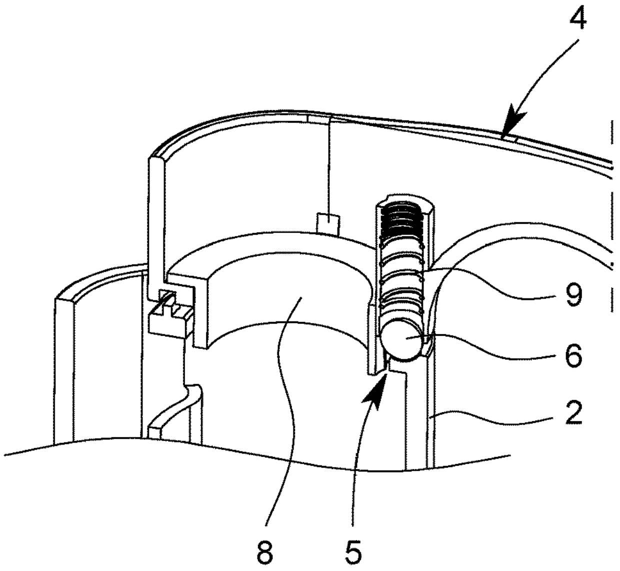
FIG. 11 shows a schematic section of a further alternative embodiment of a latching device according to the invention.
Figure 12:
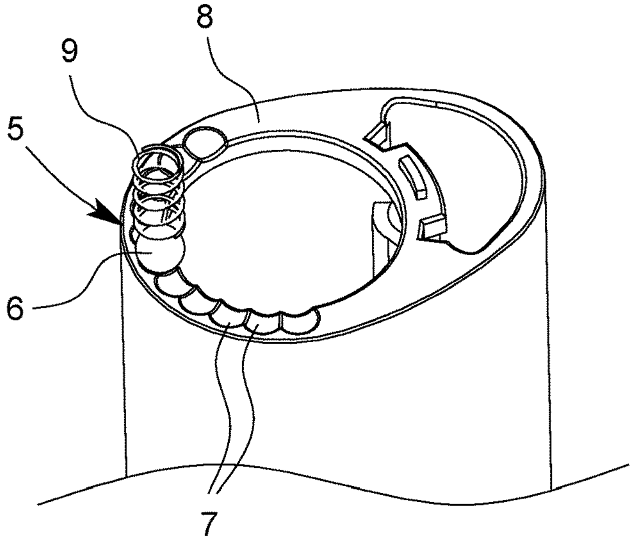
FIG. 12 shows a schematic perspective view of the latching device shown in FIG. 11.

An alternative embodiment of the latching device 5 is shown schematically, for example, in FIGS. 11 and 12, wherein FIG. 11 shows a section of the support device 4 arranged on the housing 2 with the latching device 5 provided.

FIG. 12 shows a schematic perspective view of parts of the pipetting device 1 shown in FIG. 11.

According to the alternative embodiment of the latching device 5 shown in FIG. 11, the engagement element 6 can also be designed as a ball which is mounted on the outer side 10 of the connecting element 8. However, the engagement element 6 is guided axially movably and not radially movably.

Furthermore, the alternative embodiment according to FIGS. 11 and 12 shows that the spring element 9 can be designed as a spiral spring and/or compression spring. Other embodiments of the spring element 9 may also be provided in this alternative embodiment. In this context, it is understood that although FIGS. 11 and 12 show a different design of the latching device 5, the previous and/or still following explanations of the pipetting device 1 according to the proposal can also apply in the same way to the alternative embodiment of the latching device 5 according to FIGS. 11 and 12.

In the illustrated and preferred embodiment according to FIG. 13—but also in the alternative embodiment according to FIGS. 11 and 12—the engagement element 6 is acted upon by the spring force of the spring element 9.

In addition, the engagement element 6 is in particular formed as a single piece.

In another embodiment, which is not shown in more detail, the engagement element 6 may also be integrally formed with the connecting element 8.

Figure 10:
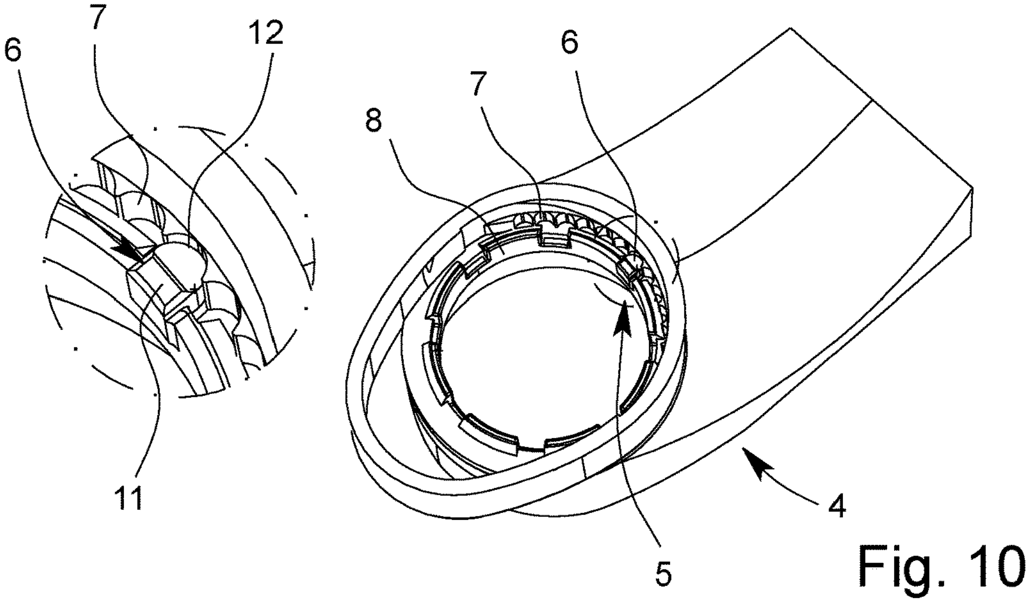
FIG. 10 shows a schematic perspective view of an alternative embodiment of a latching device according to the invention.

FIG. 10 likewise shows an alternative embodiment of the latching device 5, in which the engagement element 6 is not formed as a ball but is further firmly connected to the support device 4. In particular, according to the embodiment shown in FIG. 10, the engagement element 6 may be integrally formed with at least part of the support device 4. In the embodiment shown in FIG. 10, the engagement element 6 is designed to be hook-like.

For example, the engagement element 6 may have an arm 11, which is shown in FIG. 10 and in particular in the detailed view shown in FIG. 10. The arm 11 may be connected to the connecting element 8 at one end and have a latching lug 12 at another end, which may in particular provide a hook shape. The latching lug 12 can be brought into engagement with counter-engagement elements 7, preferably the arm 11 being of spring-elastic design and generating a spring force which counteracts rotation of the support device 4 when the latching lug 12 is engaged with one of the counter-engagement elements 7.

In this context, it is understood that also the aforementioned and/or following embodiments relating to further preferred designs of the pipetting device 1 can be applied to the now described alternative embodiment of the latching device 5 according to FIG. 10.

In an embodiment not shown, but also preferred, it is provided that the support device 4 is rotatably mounted on the housing 2 insofar as the support device 4 is removable from the housing 2, rotated to the desired rotational position and then reconnected to the housing 2. Such an arrangement is also understood to be a releasable fixing of the support device 4 to the housing 2 via the latching device 5. In particular, in this embodiment not shown, the support device 4 is held and/or mounted on the housing 2. However, it may also be provided in further embodiments that the support device 4 is held and/or mounted on the housing 2.

Figure 9:
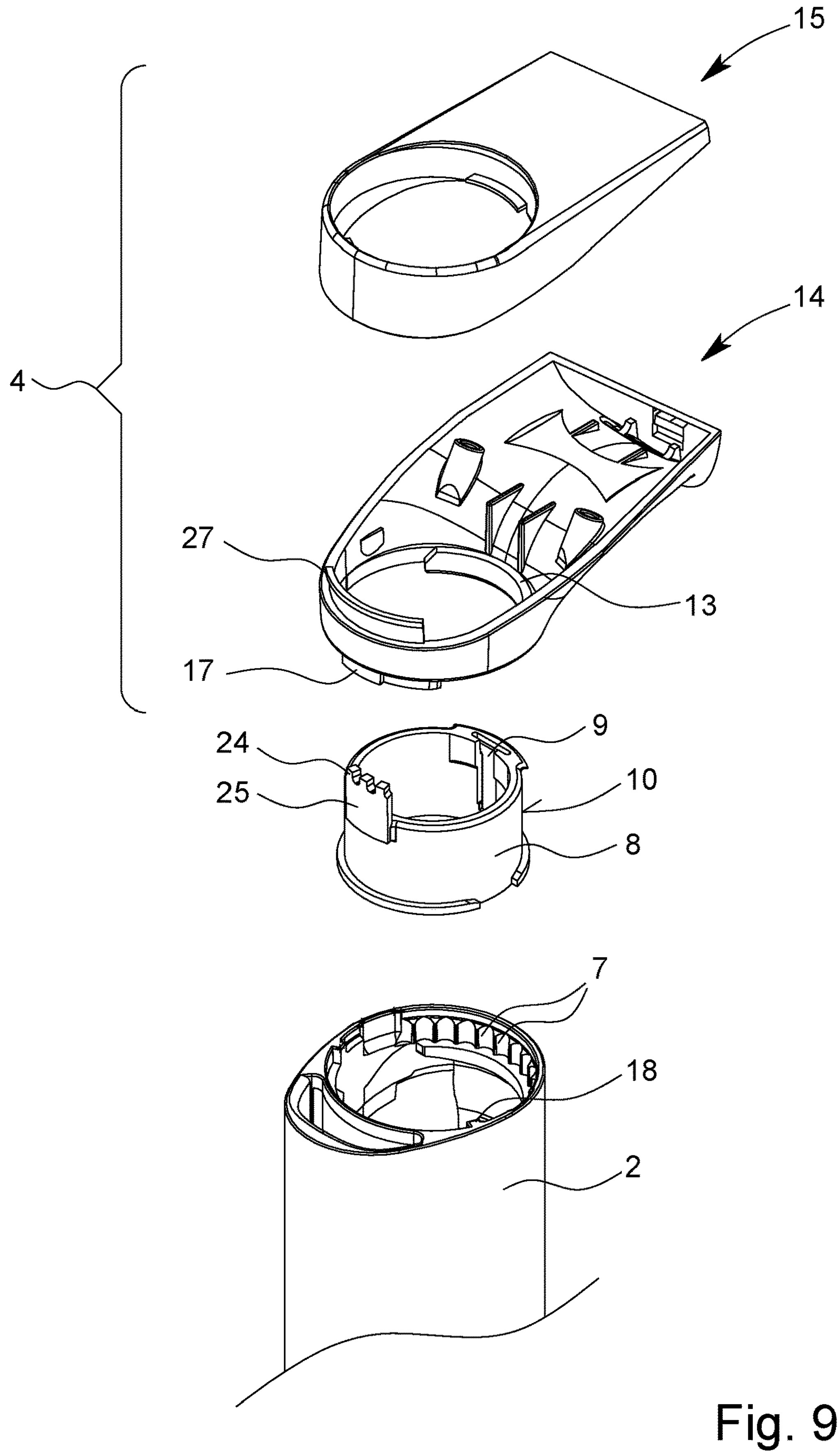
FIG. 9 shows a schematic perspective exploded view of parts of a further embodiment of a pipetting device according to the invention.

FIG. 9 shows an exploded view of parts of the pipetting device 1 according to the invention.

FIG. 9 shows part of the housing 2 as well as the components of the support device 4.

In the preferred embodiment shown in FIG. 9, the support device 4 is designed in multiple parts. Thus, the support device 4 may comprise a first support part 14. In the exemplary embodiment shown in FIG. 13, it can be seen that the first support part 14 is engaged with the housing 2, the connecting element 8 and a second support part 15. The second support part 15 can be disengaged from the support part 14 and/or fixedly connected to the first support part 14. The first support part 14 may in turn face the connecting element 8, as can be seen from the sectional view shown in FIG. 13.

The first and second support parts 14, 15 can be frictionally connected to one another, preferably via a screw connection, and/or materially connected, preferably adhesively bonded, and/or positively connected.

The second support part 15 can form an anti-rotation device 16 between the first support part 14 and the connecting element 8. The anti-rotation device 16 is shown in more detail in FIG. 14. In the preferred exemplary embodiment shown in FIG. 14, it is provided that the anti-rotation device 16 is formed by a toothing 23 provided on the second support part 15, which is formed in particular corresponding and/or complementary to a counter-toothing 24 of the connecting element 8. The counter-toothing 24 on the connecting element 8 is arranged on a connecting projection 25 of the connecting element 8. The toothing 23 and the counter-toothing 24 can in particular mesh with one another or be in a non-positive, positive and/or frictional engagement with one another in the connected state and thus preferably form the anti-rotation device 16.

Accordingly, the teeth of the toothing 23 engage in the gaps formed between adjacent counter-teeth of the counter-toothing 24 preferably in a form-fit manner. In addition, the counter-teeth of the counter-toothing 24 engage in the gaps formed between adjacent teeth of the toothing 23 preferably in a form-fit manner.

Further, FIG. 14 shows that in a preferred exemplary embodiment, the number of teeth of the toothing 23 exceeds the number of counter-teeth of the counter-toothing 24. This allows the counter-toothing 24 to be arranged in multiple positions on the toothing 23 to form the anti-rotation device 16. This is particularly useful for arranging the connecting element 8 in different positions relative to the support device 4.

Figure 5:
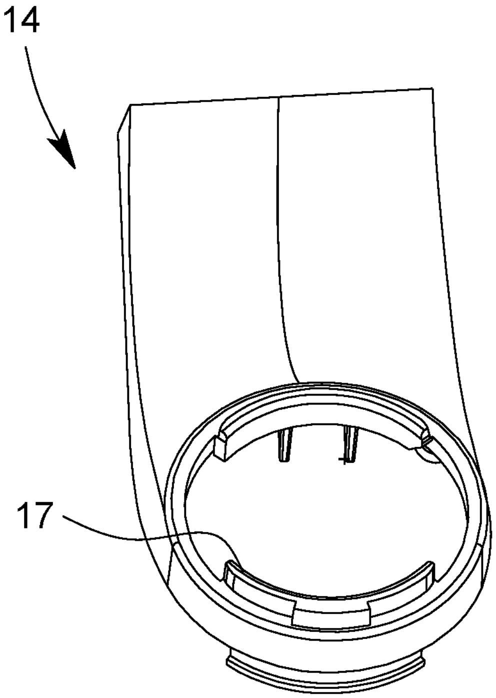
FIG. 5 shows a schematic perspective detail view of a stop of a support device according to the invention.
Figure 6:
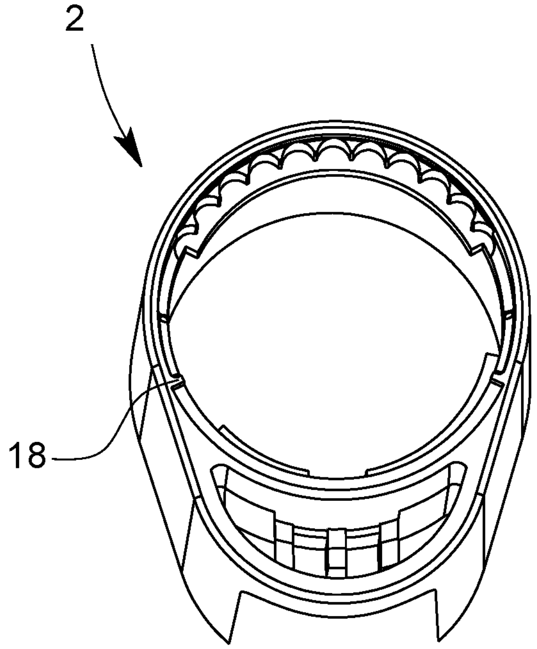
FIG. 6 shows a schematic perspective detail view of a counter stop of a housing according to the invention.

In another preferred embodiment, shown in more detail in FIGS. 5 and 6, it is provided that the support device 4 has a stop 17 and the housing 2 has a counter stop 18, which limit the distance that the support device 4 is rotatable relative to the housing 2. The stop 17 on the support device 4, in particular on the first support part 14, is shown in a detailed view in FIG. 5. The counter stop 18 corresponding to this is shown in more detail in FIG. 6, which also shows a schematic perspective detailed view of the housing 2. In the installed state, the interaction between stop 17 and counter stop 18 now enables the maximum rotation of the support device 4 to be limited, preferably by up to +/−80°, preferably up to +/−60°, more preferably +/−50°+/−20%, starting from a zero position of the support device 4. Such a zero position or original position of the support device 4 is shown schematically, for example, in FIG. 7A.

It is not shown in more detail that the pipetting device 1 has a device for haptic and/or acoustic indication of one of the rotational positions. In particular, this makes it possible to indicate to the operator in a simple manner that a latching of the latching device 5 is present.

In FIG. 9, the operating element 20, which is shown in FIG. 1, for example, and a volume setting sleeve are not shown in more detail or have been omitted for reasons of simple illustration. Furthermore, it is not shown in more detail in FIG. 9 that connecting members can be provided, in a preferred exemplary embodiment screws, which can be used for connection, in particular for force-fit connection, of the first and second support parts 14, 15.

In addition, FIG. 13 shows that a slider 26 is arranged between the first and second support parts 14, 15, which can be used for adjustment.

Furthermore, in another preferred embodiment shown in FIG. 13, additional hooks 27 can be provided to improve the interaction and the holding together of the support device 4 and/or of the first and second support parts 14, 15 with each other. The hooks 27 can be inserted into corresponding hook receptacles 28 or hook receptacles 28 designed to receive, preferably for engagement, the hooks 27, and/or can be arranged in the hook receptacles 28 in a form-fitting and/or friction-fitting manner.

In the embodiment according to FIG. 13, it is shown that the hooks 27 can be formed on both the first and the second support part 14, 15, the corresponding hook receptacles 28 being formed on the respective other support part 14, 15 in a complementary manner to the hooks 27.

Furthermore, FIG. 13 schematically shows the form-fit/positive arrangement of the hooks 27 of the first and the second support part 14, 15 in corresponding and/or complementary hook receptacles 28 on the respective other support part 14, 15.

Not shown is a further, in particular alternative embodiment of a pipetting device 1 according to the invention for receiving and dispensing fluid volumes. In this case, the pipetting device 1 can have a housing 2 with a holding portion 3, which is designed to hold the pipetting device 1 by means of an operator's hand.

In this embodiment, which is not shown, the pipetting device has a support device 4, which is designed to support the pipetting device 1 on a finger of an operator, the support device 4 being rotatable relative to the holding portion 3, preferably about a longitudinal axis L of the pipetting device 1.

The support device 4, the housing 2 and/or the holding portion 3 may be designed/constructed according to the embodiments described above.

Furthermore, in this embodiment not shown, the pipetting device may have a locking device by means of which the support device 4 is releasably lockable in a plurality of different rotational positions on the housing 2. This locking device is not shown in more detail.

In a further alternative pipetting device 1 for receiving and dispensing fluid volumes, which according to the invention represents in particular an independent aspect of the invention, it is provided that the pipetting device 1 has a releasable form-fitting connection between a first and a second component of the pipetting device 1. In the illustrated exemplary embodiment according to FIGS. 15 and 16, the first component is the connecting element 8, while the second component is formed by the first support part 14.

In principle, the first and second components may also be formed by other components of the pipetting device 1 in further embodiments not shown.

Figure 15:
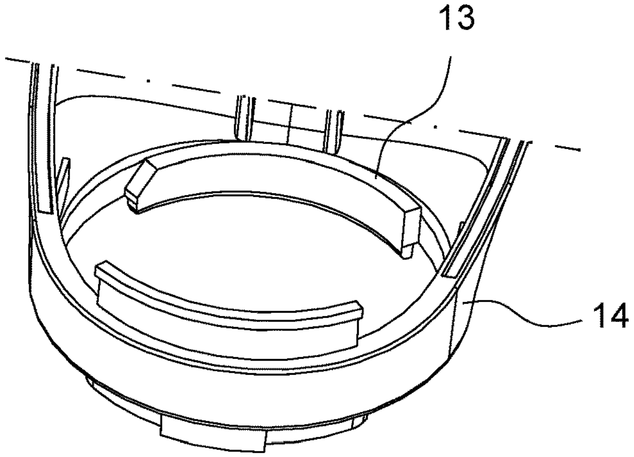
FIG. 15 shows a schematic perspective view of a part of a first support part according to the invention.
Figure 16:
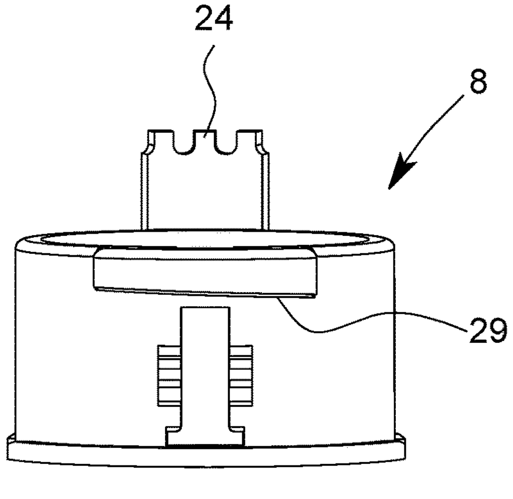
FIG. 16 shows a schematic front view of a further embodiment of a connecting element according to the invention.

The form-fitting connection is also designed in such a way that the first and the second component—in the illustrated exemplary embodiment according to FIGS. 15 and 16 the connecting element 8 and the first support part 14—are in direct contact with each other, preferably inserted into each other, at least in certain regions, which is apparent in particular from FIGS. 9 and 13. The first and the second component (connecting element 8 and first support part 14) are connectable to and disconnectable from each other by rotating them in opposite directions, respectively. In this case, the first component (the connecting element 8 in the exemplary embodiment shown in FIG. 16) has a first inclined plane 29 and the second component (the first support part 14 in the exemplary embodiment shown in FIG. 15) has a further inclined plane 13, formed complementary to the first inclined plane 29, for realizing the form-fitting connection, in particular the bayonet lock.

Individual aspects of the invention described above may be implemented independently from each other, but may also be implemented and advantageous in any combination.

LIST OF REFERENCE SIGNS

1 Pipetting device
2 Housing
3 Holding portion
4 Support device
5 Latching device
6 Engagement element
7 Counter-engagement element
8 Connecting element
9 Spring element
10 Outer side
11 Arm
12 Latching lug
13 Further inclined plane
14 First support part
15 Second support part
16 Anti-rotation device
17 Stop
18 Counter stop
19 Drive device
20 Operating element
21 Projections from 8
22 Recess
23 Toothing
24 Counter-toothing
25 Connecting projection
26 Slider
27 Hooks
28 Hook receptacles
29 First inclined plane
L Longitudinal axis

What is claimed is:

1. A pipetting device for receiving and dispensing fluid volumes, comprising a housing having a holding portion configured for holding the pipetting device by an operator's hand, a support device configured for supporting the pipetting device on a finger of an operator, wherein the support device is rotatable relative to the holding portion, about a longitudinal axis (L) of the pipetting device, and a latching device with which the support device is releasably fixable to the holding portion in a plurality of different defined rotational positions.

2. The pipetting device according to claim 1, wherein the support device is releasably fixable to the housing in at least three defined rotational positions and adjacent rotational positions are spaced apart from one another at a rotation angle of at least 5°.

3. The pipetting device according to claim 1, wherein the latching device has an engagement element that is a separate element from the housing and a plurality of counter-engagement elements on the housing, and wherein the engagement element can be brought into positive, non-positive and/or frictional engagement with each counter-engagement element, the support device respectively being releasably fixed to the holding portion in one of the rotational positions by the engagement element.

4. The pipetting device according to claim 3, wherein the counter-engagement elements are formed on the housing, by recesses and/or elevations on the housing.

5. The pipetting device according to claim 3, wherein the latching device comprises a connecting element which is rotatably connected to the housing and non-rotatably connected to the support device and on which the engagement element is movably arranged.

6. The pipetting device according to claim 5, wherein a spring element is arranged at the connecting element, and the engagement element is arranged between the spring element and the counter-engagement elements, in such a way, that the spring force of the spring element counteracts rotation of the support device when the engagement element is engaged with one of the counter-engagement elements and/or that the spring force of the spring element acts on the engagement element in the direction of one of the counter-engagement elements.

7. The pipetting device according to claim 5, wherein the engagement element comprises an arm which is connected at one end to the connecting element and comprises a latching lug at another end which is engageable with the counter-engagement element, wherein the arm is spring-elastic and generates a spring force which counteracts a rotation of the support device when the latching lug is engaged with one of the counter-engagement elements.

8. The pipetting device according to claim 5, wherein the support device is formed in multiple parts and comprises a first support part and a second support part, wherein the first support part is in engagement with the housing, the connecting element and the second support part, and wherein the second support part forms an anti-rotation device between the first support part and the connecting element.

9. The pipetting device according to claim 3, wherein the latching device is configured such that a torque of at least 5 Ncm is required to rotate the support device when the engagement element is engaged with a counter-engagement element.

10. The pipetting device according to claim 1, wherein the support device comprises a stop and the housing comprises a counter stop, which limit the path that the support device is rotatable relative to the housing.

11. The pipetting device according to claim 1, further comprising a device for haptic and/or acoustic indication of one of the rotational positions.

12. The pipetting device according to claim 1, wherein an actuating element for a displacement element of the pipetting device is carried by the support device and a mount for a pipette tip is provided on the holding portion, and wherein said plurality of different defined rotational positions enable adjustment of the pipetting device for use by either left-handed and right-handed operators or by operators with hands of different sizes.

13. A pipetting device for receiving and dispensing fluid volumes, comprising a housing having a holding portion configured for holding the pipetting device by an operator's hand, a finger support for supporting the pipetting device on a finger of an operator, wherein the finger support extends radially outward relative to the holding portion and is rotatable relative to the holding portion about a longitudinal axis of the pipetting device, and a latching device having a first part rotationally fixed relative to the finger support and a second part fixed relative to the holding portion, wherein the support device is releasably fixable relative to the holding portion in a plurality of different defined rotational positions by releasable engagement of the first and second parts of the latching device.

* * * * *